United States Patent [19]

Hauenstein et al.

[11] Patent Number: 5,145,912

[45] Date of Patent: Sep. 8, 1992

[54] METHOD FOR PREPARING OXIMOSILANE-FUNCTIONAL VINYLIC COPOLYMERS

[75] Inventors: Dale E. Hauenstein; Harold L. Vincent, both of Midland County, Mich.

[73] Assignee: Dow Corning Corporation, Midland, Mich.

[21] Appl. No.: 628,530

[22] Filed: Dec. 17, 1990

[51] Int. Cl.$^5$ ............................................. C08F 30/08
[52] U.S. Cl. ................................ 525/326.5; 525/377
[58] Field of Search ...................... 525/474, 326.5, 377

[56] References Cited

U.S. PATENT DOCUMENTS

| | | | |
|---|---|---|---|
| 3,453,230 | 7/1969 | Plueddemann | 260/41 |
| 4,043,953 | 8/1977 | Chang et al. | 260/18 S |
| 4,157,321 | 6/1979 | Kawakami et al. | 260/29.1 SB |
| 4,499,150 | 2/1985 | Dowbenko et al. | 428/447 |
| 4,578,417 | 3/1986 | Kurukawa et al. | 524/378 |
| 4,684,697 | 8/1987 | Chang et al. | 525/100 |
| 4,714,738 | 12/1987 | Chang et al. | 525/58 |
| 4,795,783 | 1/1989 | Hunt | 525/101 |
| 4,925,964 | 5/1990 | Zoche | 556/422 |

OTHER PUBLICATIONS

Noll, Chem. and Tech. of Silicones, 1968 pp. 82 and 110.

*Primary Examiner*—Melvyn I. Marquis
*Assistant Examiner*—D. E. Aylward
*Attorney, Agent, or Firm*—Alexander Weitz

[57] ABSTRACT

An efficient method for preparing an oximosilane-functional vinylic copolymer is disclosed wherein the corresponding alkoxysilane-functional vinylic copolymer is reacted with an organoketoxime in a dry environment. The oximosilane-functional vinylic copolymers produced by the method of the present invention find utility in moisture-curable coating systems.

16 Claims, No Drawings

METHOD FOR PREPARING OXIMOSILANE-FUNCTIONAL VINYLIC COPOLYMERS

FIELD OF THE INVENTION

The present invention relates to a method for preparing an oximosilane-functional vinylic copolymers. More particularly, this invention relates to a method for preparing these copolymers wherein an alkoxysilane-functional vinylic copolymer is reacted with an organoketoxime, this reaction being more effective than prior art addition polymerization methods.

BACKGROUND OF THE INVENTION

There has been considerable recent interest in the development of new ambient cure coating systems. A major consideration in this regard is the desire to replace existing systems which require elevated cure temperatures, systems which contain or release toxic substances during cure, and systems which are generally slow to cure.

For example, in the "color-plus-clear" coating systems for automotive topcoats, final coats of a clear coating are applied over a pigmented basecoat. Known color-plus-clear coating systems based on thermosetting resins require cure temperatures of at least 120° C. In addition, one- and two-part polyurethane systems rely on organic isocyanates for their cure, and therefore suffer from the physiological hazards associated with the inhalation of, or skin contact with, these compounds. In an effort to overcome these disadvantages, current technology has focused on the use of systems which rely on alkoxysilane functionality for a less toxic, more rapid ambient cure mechanism.

U.S. Pat. No. 4,499,150 to Dowbenko et al. discloses a color-plus-clear coating method wherein a vinylic addition copolymer containing alkoxysilane and/or acyloxysilane functionality is present in either the basecoat or the topcoat. However, the curing time of such a system may still be slow, even when a curing catalyst, such as dibutyltin dilaurate, dibutyltin dimaleate or tetrabutyl titanate is added. A prolonged cure time after application of the coating to the substrate can result in cracks or other undesirable properties.

The above application of a vinylic copolymer which contains hydrolyzable silane moieties in its molecule is but one illustration of the utility of such systems. Of these copolymers, those having oximosilane-functional groups can offer particular advantages as ambient cure, one-part coatings: they exhibit faster, more thorough cure and they show improved physical and chemical properties over the corresponding alkoxysilane-functional copolymer coatings.

However, as desirable as these oximosilane-functional vinylic copolymers may be, their heretofore disclosed methods of preparation are somewhat limited and have been observed to be relatively inefficient relative to our discovered preparative method, described infra. Thus, to date, essentially three procedures have been describe for the preparation of vinylic copolymers containing various types of hydrolyzable silane functionality. For example, Plueddemann, in U.S. Pat. No. 3,453,230, teaches room temperature curable acrylate rubbers wherein a mixture of an acrylic monomer, a silane monomer which contains an unsaturated group as well as a hydrolyzable group, a mercapto-functional silane and a free radical catalyst is polymerized in the absence of water. The resulting copolymer can be cured by exposure to moist air.

In U.S. Pat. No. 4,157,321 to Kawakami et al., copolymers of an ethylenically unsaturated organic monomer and an unsaturated organosilane monomer are shown to be stabilized by the addition of a compound selected from monomeric hydrolytically reactive organosilanes or trialkyl orthoformates. The copolymers of this invention are prepared by conventional addition polymerization methods.

Furukawa et al., in U.S. Pat. No. 4,578,417, disclose a moisture curable composition having improved storage stability comprising a hydrolyzable silyl group-containing vinyl polymer and an orthoacetic acid ester as a stabilizer. The polymers of this contribution to the art are said to be prepared by either the above mentioned addition polymerization technique or by hydrosilation of a vinyl polymer having a carbon-carbon double bond with a hydrosilane.

U.S. Pat. No. 4,795,783 to Hunt teaches coating compositions which comprise a blend of a hydroxyl-functional vinyl polymer and an organopolysiloxane containing hydrolyzable groups. The latter, in turn, is prepared by the partial hydrolysis of a silane containing hydrolyzable groups.

Chang et al. teach acrylic-silane copolymer compositions in U.S. Pat. Nos. 4,043,953, 4,684,697 and 4,714,738. Again, these disclosures do not suggest the method of the present invention, but do discuss three conventional ways to prepare the copolymers. One of these methods is the above mentioned procedure of addition polymerization of an acrylic monomer together with an alkoxysilane having acrylic functionality thereon in the presence of a free radical initiator. A second method involves the hydrosilation of an acrylic addition copolymer containing carbon-carbon double bonds with a hydrosilane in the presence of a transition metal catalyst. The third method contemplates a reaction between a hydroxyl-functional acrylic resin with a minimal quantity of certain organosilicon-containing materials, such as organosilicates or their partial hydrolysis products.

SUMMARY OF THE INVENTION

Although the above discussed methods for the preparation of vinylic copolymers containing various hydrolyzable silane groups do yield the desired products, inventors have discovered an alternate method for producing oximosilane-functional vinylic copolymers which is highly efficient. Thus, for example, the most common and straightforward conventional method for preparing these vinylic copolymers is the addition copolymerization of organic vinylic monomers with the appropriate silane-functional vinylic monomer in the presence of a free radical initiator, as briefly described supra. Applicants have found, however, that such a procedure is relatively inefficient when an oximosilane-functional vinylic monomer is one of the reactants of the addition polymerization scheme. While not wishing to be bound by any theoretical consideration or a particular mechanistic interpretation, it is believed that the oximosilane functionality may partially deactivate the free radical initiator required to effect the addition polymerization. This drawback is overcome by the present method since no free radical initiator is required during the reaction of the alkoxysilane-functional vinylic copolymer (which can be efficiently produced by a routine addition polymerization procedure) with the organoketoxime.

The present invention therefore relates to a method for preparing an oximosilane-functional vinylic copolymer comprising reacting an alkoxysilane-functional vinylic copolymer (I) with an organoketoxime (II), said alkoxysilane-functional vinylic copolymer having recurring units represented by the formula

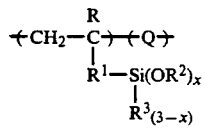

wherein R is selected from the group consisting of hydrogen and an alkyl radical having 1 to 3 carbon atoms, $R^1$ is a divalent organic radical, $R^2$ is an alkyl radical having 1 to 6 carbon atoms, $R^3$ is selected from the group consisting of alkyl radicals having 1 to 6 carbon atoms, a phenyl radical, a styryl radical and an alpha-methylstyryl radical, x is an integer having a value of 1 to 3 and —Q— represents a residue of an ethylenically unsaturated organic monomer, said reaction being carried out in a dry environment.

DETAILED DESCRIPTION OF THE INVENTION

The method of the present invention involves the reaction of an alkoxysilane-functional vinylic copolymer (I) with an organoketoxime (II) to produce an oximosilane-functional vinylic copolymer.

The alkoxysilane-functional vinylic copolymer of this invention has recurring units represented by the formula

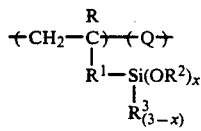
(I)

wherein R is selected from the group consisting of hydrogen and an alkyl radical having 1 to 3 carbon atoms. In formula (I), $R^1$ is a divalent organic radical containing carbon, hydrogen and, optionally, oxygen and/or nitrogen atoms. It is preferred that $R^1$ is selected from an alkylene group having from 1 to 6 carbon atoms, an amide group having the formula —C(O)N(H)$R^4$—, or an ester group having the formula

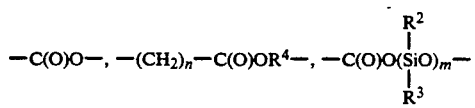

or —C(O)O$R^4$—, in which $R^4$ is an alkylene group having 1 to 6 carbon atoms and the values of the integers m and n can be 1 to 6. The group $R^2$ in the preceding formulas is an alkyl radical having 1 to 6 carbon atoms, $R^3$ in the preceding formulas is selected from the group consisting of alkyl radicals having 1 to 6 carbon atoms, a phenyl radical, a styryl radical and an alpha-methylstyryl radical and x is an integer having a value of 1 to 3. The divalent group Q in formula (I) represents the residue of an ethylenically unsaturated, silicon-free organic monomer, described infra.

As is well documented in the art, the above mentioned alkoxysilane-functional vinylic copolymer (I) may readily be prepared by the free radical addition copolymerization of at least one ethylenically unsaturated organic monomer, which forms the residue Q of formula (I), with an alkoxysilane-functional ethylenically unsaturated monomer having the following general formula, wherein R, $R^1$, $R^2$, $R^3$ and x have their above defined meanings.

(Ia)

In brief, the copolymerization procedure generally involves the slow introduction of a mixture of the appropriate monomers into a preheated organic solvent system. A free radical initiator, such as a peroxide, peroxyester or nitrile type, is added either to the initial solvent system or to the monomer mix before the addition is started. The reaction is carried out in an inert atmosphere since the free radical initiator is generally deactivated by oxygen.

The above mentioned ethylenically unsaturated organic monomers which form the residue Q of formula (I) may be selected from compounds recited in, e.g., above mentioned U.S. Pat. No. 4,157,321 to Kawakami et al. Among others, these include alkyl acrylates, such as methyl acrylate, ethyl acrylate, propyl acrylate, butyl acrylate, hexyl acrylate, octyl acrylate, methyl methacrylate, butyl methacrylate lauryl methacrylate, isobornyl methacrylate, lauryl acrylate, isobornyl acrylate, and octyl methacrylate; vinyl aromatic hydrocarbons, such as styrene, vinyl toluene and alpha-methyl styrene; vinyl and vinylidene halides, such as vinyl chloride and vinylidene chloride; conjugated dienes, such as butadiene and isoprene; and vinyl esters, such as vinyl acetate and vinyl propionate.

In addition to the above described organic monomers which form the residue Q of formula (I), the following fluorinated structures may be used:

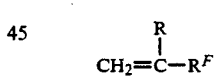

and

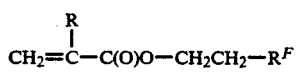

in which R has its previously defined meaning and $R^F$ is a perfluorinated alkyl radical having 3 to 8 carbon atoms. Examples of such fluorinated organic monomers include structures such as

and

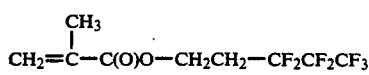

In applying the method of the present invention, it is preferred that the ethylenically unsaturated organic monomers are selected from acrylate and methacrylate structures, most preferably, methyl methacrylate, butyl methacrylate, ethyl methacrylate, isobutyl methacrylate, methyl acrylate, butyl acrylate, ethyl acrylate, and isobutyl acrylate. It is likewise preferred that the above mentioned alkoxysilane-functional vinylic monomer of formula (Ia) is selected from an acrylamide type, wherein $R^1$ has the structure —C(O)N(H)$R^4$—, an alkenyl type, wherein $R^1$ is an alkylene group having 1 to 6 carbon atoms or an acrylic type, wherein $R^1$ has the structure —C(O)O$R^4$—, $R^4$ of the previous formulas having its previously defined meaning. An acrylic type of alkoxysilane-functional monomer is highly preferred wherein $R^1$ of formula (Ia) is —C(O)O$R^4$—, in which $R^4$ is an alkylene group having 1 to 6 carbon atoms, R of formula (Ia) is hydrogen or a methyl radical and $R^2$ of formula (Ia) is a methyl radical.

Examples of highly preferred alkoxysilane-functional monomers which may be copolymerized with the above mentioned preferred ethylenically unsaturated organic monomers, are represented by the following formulas. Formula (Ib) illustrates an acrylic type of alkoxysilane-functional monomer.

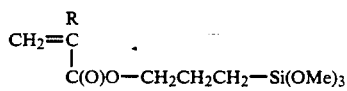 (Ib)

wherein Me hereinafter denotes a methyl radical and R is either H or Me.

Formula (Ic) illustrates an acrylamide type of alkoxysilane-functional monomer.

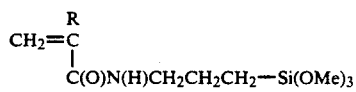 (Ic)

wherein R is either H or Me.

Formulas (Id) and (Ie) illustrate alkenyl types of alkoxysilane-functional monomers.

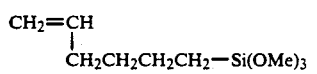 (Id)

 (Ie)

wherein Et hereinafter denotes an ethyl radical.

The organoketoxime (II) which is reacted with the above described alkoxysilane-functional vinylic copolymer (I) may be any organic compound having the general functionality

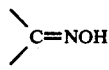

in its structure. The only limitation on the organic groups of the above structure is that they be inert and not react with component (I) or otherwise detract from carrying out the method described herein. Preferably, these compounds are diorganoketoximes, such as those represented by the general formula

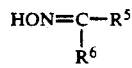 (II)

in which $R^5$ and $R^6$ are each selected from the group consisting of alkyl radicals having 1 to 6 carbon atoms.

Alternatively, component (II) can have a structure such as

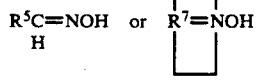

wherein $R^7$ is a cyclic divalent hydrocarbon species, such as a cyclohexyl type radical (i.e., —$C_6H_{10}$—), and $R^5$ has its previously defined meaning.

The above organoketoxime compounds are well known in the art and some are available commercially. They may be prepared by reacting the corresponding ketone with hydroxylamine. Specific examples of this component include dimethylketoxime, methylethylketoxime, methylbutylketoxime, methylpropylketoxime, diethylketoxime, benzylmethylketoxime and methylphenylketoxime.

For the purposes of the present invention, it is preferred that organoketoxime (II) is methylethylketoxime, which has the structure

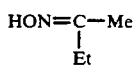 (IIa)

In order to practice the method of the present invention, the alkoxysilane-functional vinylic copolymer (I) and the organoketoxime (II) are reacted with each other by simply mixing these components at elevated temperatures, such as 55° to 80° C., for example. It is preferred that the temperature is sufficient to boil off the byproduct alcohol formed in the reaction of the alkoxy groups of component (I) with the ketoxime functionality of component (II). The following reaction illustrates this process for the case of a trimethoxysilane-functional compound reacting with methylethylketoxime to form the corresponding oximosilane-functional compound and methanol as a byproduct.

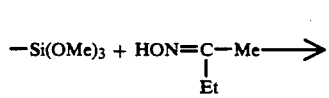

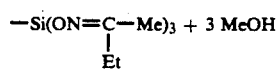

In the above case, the reaction can be effectively completed within about 300 minutes at or near the boiling point of the methanol (i.e., approximately 65° C.). It is also possible to use lower temperatures if a vacuum is applied during the reaction to remove the byproduct alcohol.

It is further preferred that the reaction be carried out in an inert organic solvent, such as toluene, xylene, mineral spirits, VM & P naphtha or methylisobutyl ketone. These solvents are typically present during the formation of the alkoxysilane-functional vinylic copolymer (I) and may be retained during the above described reaction. Alternatively, the reaction can be run at 100 percent solids, but this is less preferred since viscosity is greater and reactivity is diminished. When a solvent is employed, components (I) and (II) should comprise from about 15 to about 65 weight percent of the total reaction mixture.

The skilled artisan will, of course, appreciate the need for conducting the above reaction in the absence of moisture since both the alkoxysilane and the oximosilane functionalities are susceptible to hydrolysis. Thus, it is preferred to react the components in a dry inert gas atmosphere in order to preserve the integrity of the hydrolyzable groups. However, it should be noted that unlike the case of the aforementioned addition polymerization reactions, there is no particular need to exclude oxygen from the reaction vessel as there is no concern for the deactivation of a free radical initiator in this instance.

The proportions of components (I) and (II) to be used in the instant method are preferably such that about 0.5 to about 1.5 equivalents of the organoketoxime is used for each equivalent of alkoxy functionality present in the alkoxysilane-functional vinylic copolymer. Preferably, an excess of the organoketoxime is employed wherein 1.5 equivalents of the organoketoxime is used for each equivalent of alkoxy functionality.

After the oximosilane-functional vinylic copolymers of the present invention are prepared, it is preferred that a stabilizing amount of an oximosilane crosslinker is added in order to prevent viscosity drift and/or gellation. Typical oximosilanes which may be used for this purpose include such compounds as taught in U.S. Pat. No. 3,189,576 to Sweet:

(MeEtC=NO)$_3$SiVi (vinyltris(methylethylketoximine)silane),
(MeEtC=NO)$_3$SiMe (methyltris(methylethylketoximine)silane) and
(MeEtC=NO)$_4$Si (tetrakis(methylethylketoximine)silane), in which Vi denotes a vinyl radical.

The oximosilane-functional vinylic copolymers produced by the method of the present invention find utility as moisture-curable coating systems. They are particularly suitable in replacing systems which require elevated temperatures for cure, systems which contain or release toxic components during their cure and systems which are generally slow to cure.

EXAMPLES

The following examples are presented to further illustrate the method of this invention, but are not to be construed as limiting the invention, which is delineated in the appended claims. All parts and percentages in the examples are on a weight basis and all measurements were obtained at 25° C., unless indicated to the contrary.

EXAMPLE 1

This example illustrates the preparation of an oximosilane-functional acrylic monomer.

Into a 1000-ml glass 3-neck round-bottom flask, equipped with a condenser fitted with a Dean-Stark trap, a stirrer, a nitrogen inlet, a thermometer and a temperature regulator, there was charged 150 grams of 3-methacryloxypropyltrimethoxysilane, 235 grams of methylethylketoxime (Mooney Chemical, Inc., Cleveland, OH) 115 grams of dry toluene, and 2 grams of magnesium oxide (Magnox ™ 98 HR Fine; Basic Incorporated, Valley Forge, PA). Three drops of diethyl hydroxylamine was added as a polymerization inhibitor. The mixture was slowly heated to 130° C. while stirring under a nitrogen atmosphere. Methanol byproduct of the reaction was collected in the Dean-Stark trap. Excess reactants were stripped off under a vacuum down to 31 mm Hg as the temperature slowly rose to 135° C. The product of the reaction was then cooled to below 40° C., filtered and packaged under a nitrogen blanket. Infrared analysis showed an 85-90% conversion of methoxy groups to oxime groups.

EXAMPLE 2

This example illustrates the preparation of an intermediate copolymer of the present invention by a conventional addition polymerization method wherein an alkoxysilane-functional acrylic monomer and a combination of acrylate monomers was reacted in the presence of a free radical initiator.

Into a 1000-ml glass 3-neck round-bottom flask equipped with a thermometer, condenser, stirrer, heating mantle, temperature control, addition funnel and nitrogen inlet, there was added 150.34 grams of toluene (Fisher-Certified grade) which had previously been dried over molecular sieves. The toluene was heated to 98° C. under the nitrogen blanket. A mixture of 57.66 grams of toluene, 30.00 grams of 3-methacryloxypropyltrimethoxysilane, 110.00 grams methyl methacrylate (Rohm and Haas, Philadelphia, PA) containing 10 ppm of methylhydroquinone (MEHQ), 20.00 grams of butyl methacrylate containing 10 ppm of MEHQ (Rohm and Haas), 40.00 grams of styrene (Fisher Certified grade; 50 ppm of t-butylcatechol) and 8.00 grams of t-butylperoxyacetate, marketed under the trade name Lupersol ™ 70 (Pennwalt Corp., Buffalo, NY), was placed in the addition funnel.

The above monomer mixture was added slowly (approximately 140 drops per minute) to the flask over a period of 3 hours. The temperature was held at 103°-105° C. for 1 hour after the addition of the monomers. The resulting solution was allowed to cool below 45° C. and packaged under nitrogen. Essentially complete conversion of the monomers to a copolymer was evidenced by the observation that the final solids content was 48.4% versus a theoretical solids content of 49.0% based upon the initial charge.

(COMPARATIVE) EXAMPLE 3

This example illustrates a conventional addition polymerization of an oximosilane-functional monomer with a combination of acrylate monomers to prepare an oximosilane-functional acrylic copolymer.

The procedure of Example 2 was followed wherein 150.08 grams of toluene was heated in a flask to 92° C. A mixture of 29.00 grams of toluene, 15.01 grams of the oximosilane-functional acrylic monomer produced in Example 1, 55.01 grams of methyl methacrylate, 10.01 grams of butyl methacrylate, 20.00 gram styrene and 4.02 grams of t-butylperoxyacetate was charged to the addition funnel.

The above monomer mix was slowly added (approximately 100 drops per minute) to the flask over a period of 1 hour. The temperature was held between 97°-100° C. for 1 hour after the addition of the monomers. The resulting solution was allowed to cool below 45° C. and packaged under nitrogen.

A relatively incomplete reaction was indicated since the copolymer solution had a solids content of 17% versus a theoretical solids content of 35.8% based on the initial monomer charge.

(COMPARATIVE) EXAMPLE 4

In this example, the conventional addition copolymerization of an oximosilane-functional monomer with a combination of acrylate monomers was repeated to show the effect of excess initiator.

Toluene (125.06 grams) was heated in a flask to 94° C. A mixture of 25.04 grams of toluene, 15.07 grams of the oximosilane-functional acrylic monomer produced in Example 1, 10.00 grams of methyl methacrylate, 55.07 grams of butyl methacrylate, 24.02 gram of styrene and 4.04 grams of t-butylperoxyacetate was charged to the addition funnel.

The above monomer mix was slowly added (approximately 140 drops per minute) to the flask containing over a period of 45 minutes. The temperature was held between 100°–104° C. for 1 hour after the addition of the monomers. The resulting solution was cooled to approximately 40° C. and packaged under nitrogen.

As in (Comparative) Example 3, the low copolymer solids content (21.1% versus a theoretical value of 41.0% based on the initial charge) confirmed the inefficient nature of this reaction procedure.

The above copolymer solution was reheated to 95° C. and a solution of 1 gram of t-butylperoxyacetate in 23.00 gram toluene was placed in the addition funnel and added to the copolymer solution at a rate of approximately 109 drops/minute over a period of 27 minutes. The temperature was held between 96°–100° C. for 1 hour after the addition of the t-butylperoxyacetate solution.

The above copolymer solution was then cooled to approximately 40° C. and packaged under nitrogen. The solids content of this solution was now 28.6%, indicating that the addition of extra initiator (t-butylperoxyacetate) resulted in only a modest increase in copolymer yield.

EXAMPLE 5

This example illustrates the preparation of an oximosilane-functional acrylic copolymer by the method of the present invention wherein methylethylketoxime was reacted with an alkoxysilane-functional acrylic copolymer.

To a 500-ml glass round-bottom flask, equipped as described in Example 1, there was added 100.0 grams of the alkoxysilane-functional acrylic copolymer solution produced in Example 2, and 12.0 grams of methylethylketoxime. This combination was stirred under a nitrogen blanket, slowly heated to 75° C. and then maintained at 71°–78° C. for 5 hours. Methanol formed during the reaction was collected in the Dean-Stark trap. The contents were allowed to cool to below 45° C. and then packaged under nitrogen.

The efficiency of this reaction was evidenced by the relatively high solids content observed (42.6%) versus a theoretical solids content of 42.3%. This result, in combination with the high efficiency of the reaction described in Example 2, exemplifies the advantage of the method of the present invention in the preparation of an oximosilane-functional acrylic copolymer.

EXAMPLE 6

This example illustrates another preparation of an intermediate copolymer by a conventional addition polymerization method wherein an alkoxysilane-functional acrylic monomer and a combination of acrylic monomers was reacted in the presence of a free radical initiator.

A similar procedure to that described in Example 2 was followed wherein 350.0 grams of xylene (Fisher-Certified grade) which had previously been dried over molecular sieves was heated to 100° C. under the nitrogen blanket. A mixture of 50.0 grams of xylene, 70.3 grams of 3-methacryloxypropyltrimethoxysilane, 141.8 grams methyl methacrylate, 203.6 grams of butyl methacrylate and 16.4 grams of t-butylperoxyacetate was placed in the addition funnel.

The above monomer mixture was added slowly (approximately 205 drops per minute) to the flask over a period of 80 minutes. The temperature was held at 100°–102° C. for 1.5 hours after the addition of the monomers. The resulting solution was allowed to cool below 47° C. and packaged under nitrogen.

This procedure resulted in a copolymer solution having a solids content of 51% (versus a theoretical solids content of 51% based on the initial charge).

EXAMPLE 7

This example illustrates another preparation of an oximosilane-functional acrylic copolymer according to the methods of the present invention.

To a 500-ml glass round-bottom flask, equipped as described in Example 1, there was added 101.6 grams of the alkoxysilane-functional acrylate copolymer solution produced in Example 6, 21.0 grams of dried xylene and 13.0 grams of methylethylketoxime. This combination was stirred under a nitrogen blanket, slowly heated to 79° C. and then maintained at 77°–82° C. for about 2.5 hours. Methanol formed during the reaction was collected in the Dean-Stark trap. The contents were allowed to cool to below 45° C. and then packaged under nitrogen.

The efficiency of this reaction was evidenced by the relatively high solids content observed (39.1%) versus the theoretical solids content (39.6%).

EXAMPLE 8

This example illustrates a method of stabilizing the oximosilane-functional acrylic polymers produced according to the method of the present invention.

Various quantities of an oxime crosslinker, consisting essentially of methyltris(methylethylketoximine)silane and methyldi(methylethylketoximine)methoxysilane in a ratio of about 2.6:1, respectively, were mixed with the oximosilane-functional acrylic copolymer solution of Example 7, as shown in Table 1. These mixtures were used to fill 1-ounce vials so as to provide a headspace of about ¾ to 4/5 of the vial volume. The vials were observed for a period of 65 days and the consistency of the mixtures noted as a function of storage time at 22°–25° C. The time of gelation (i.e., when the mixture would not flow) was noted and is reported in Table 1.

TABLE 1

| WT % COPOLYMER (EXAMPLE 7) | WT % OXIME CROSSLINKER | GELATION TIME (DAYS) |
|---|---|---|
| 100.0 | 0.0 | 0.67 |
| 99.5 | 0.5 | 19 |
| 99.0 | 1.0 | 26 |
| 97.0 | 3.0 | 48 |
| 95.0 | 5.0 | *(skin-over at 65 days) |
| 90.0 | 10.0 | * |
| 85.0 | 15.0 | * |

TABLE 1-continued

| WT % COPOLYMER (EXAMPLE 7) | WT % OXIME CROSSLINKER | GELATION TIME (DAYS) |
|---|---|---|
| 80.0 | 20.0 | * |
| 70.0 | 30.0 | * |
| 50.0 | 50.0 | * |

*Flowable for more than 65 days.

It is seen that relatively stable oximosilane-functional acrylic copolymer can be obtained when at least about 5% of the above mentioned oxime crosslinker is added thereto.

For comparative purposes, the alkoxysilane-functional acrylic copolymer of Example 6 was similarly modified with tetrabutyl titanate (TBT) and methyltrimethoxysilane (MTMS), according to a conventional method practiced in the art for this type of copolymer. Table 2 shows the relative proportions of these ingredients in addition to the gel time observations described above.

TABLE 2

| WT % COPOLYMER (EXAMPLE 6) | WT % TBT | WT % MTMS | GELATION TIME (DAYS) |
|---|---|---|---|
| 100.0 | — | — | 27 |
| 99.5 | 0.5 | — | 1 |
| 99.5 | — | 0.5 | 27 |
| 99.3 | 0.5 | 0.2 | 1 |
| 99.0 | 0.5 | 0.5 | 1 |
| 98.5 | 0.5 | 1.0 | 2 |
| 97.6 | 0.5 | 2.0 | 7 |
| 96.5 | 0.5 | 3.0 | 27 |
| 95.5 | 0.5 | 4.0 | 27 |
| 94.5 | 0.5 | 5.0 | 56 |
| 92.0 | 0.5 | 7.5 | * |
| 89.5 | 0.5 | 10.0 | * |
| 79.5 | 0.5 | 20.0 | * |
| 69.5 | 0.5 | 30.0 | * |
| 49.5 | 0.5 | 50.0 | * |

*Flowable for more than 65 days.

Comparison of Tables 1 and 2 suggests that the oximosilane-functional acrylic copolymers of the present invention can be readily stabilized to approximately the same degree as conventional alkoxysilane-functional acrylic copolymers.

We claim:

1. A method for preparing an oximosilane-functional vinylic copolymer comprising:

reacting an alkoxysilane-functional vinylic copolymer (I) with an organoketoxime (II), said alkoxysilane-functional vinylic copolymer having recurring units represented by the formula

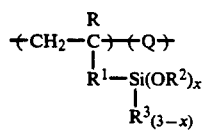

wherein R is selected from the group consisting of hydrogen and alkyl radicals having 1 to 3 carbon atoms, $R^1$ is a divalent organic radical, $R^2$ is an alkyl radical having 1 to 6 carbon atoms, $R^3$ is selected from the group consisting of alkyl radicals having 1 to 6 carbon atoms, a phenyl radical, a styryl radical and an alpha-methylstyryl radical, x is an integer having a value of 1 to 3 and —Q— represents a residue of an ethylenically unsaturated organic monomer, said reaction being carried out in a dry environment.

2. The method according to claim 1, wherein $R^1$ of said alkoxysilane-functional vinylic copolymer (I) is an ester selected from the group consisting of those represented by the formulas

—C(O)O—

—(CH$_2$)$_n$—C(O)OR$^4$—

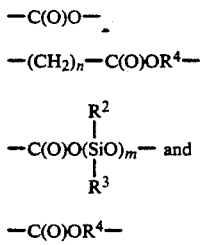 and

—C(O)OR$^4$— in which $R^4$ is an alkylene group having 1 to 6 carbon atoms, $R^2$ is an alkyl radical having 1 to 6 carbon atoms, $R^3$ is selected from the group consisting of alkyl radicals having 1 to 6 carbon atoms, and m and n are each integers having a value of 1 to 6.

3. The method according to claim 2, wherein said organoketoxime (II) is represented by the general formula

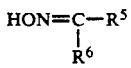

in which $R^5$ and $R^6$ are each selected from the group consisting of alkyl radicals having 1 to 6 carbon atoms.

4. The method according to claim 3, wherein $R^2$ of said alkoxysilane-functional vinylic copolymer (I) is a methyl radical.

5. The method according to claim 4, wherein x of said alkoxysilane-functional vinylic copolymer (I) is 3.

6. The method according to claim 5, wherein $R^1$ is represented by the formula

7. The method according to claim 1, wherein $R^1$ of said alkoxysilane-functional vinylic copolymer is an alkylene group having 1 to 6 carbon atoms.

8. The method according to claim 7, wherein said organoketoxime (II) is represented by the general formula

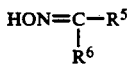

in which $R^5$ and $R^6$ are each selected from the group consisting of alkyl radicals having 1 to 6 carbon atoms.

9. The method according to claim 8, wherein $R^2$ of said alkoxysilane-functional vinylic copolymer (I) is a methyl radical.

10. The method according to claim 9, wherein x of said alkoxysilane-functional vinylic copolymer (I) is 3.

11. The method according to claim 10, wherein $R^1$ is a tetramethylene group.

12. The method according to claim 1, wherein $R^1$ of said alkoxysilane-functional vinylic copolymer (I) is an amide group represented by —C(O)N(H)R$^4$—, in which $R^4$ is an alkylene group having 1 to 6 carbon atoms.

13. The method according to claim 12, wherein said organoketoxime (II) is represented by the general formula $$HON=\underset{R^6}{\overset{}{C}}-R^5$$

in which $R^5$ and $R^6$ are each selected from the group consisting of alkyl radicals having 1 to 6 carbon atoms.

14. The method according to claim 13, wherein $R^2$ of said alkoxysilane-functional vinylic copolymer (I) is a methyl radical.

15. The method according to claim 14, wherein x of said alkoxysilane-functional vinylic copolymer (I) is 3.

16. The method according to claim 15, wherein $R^1$ is represented by the formula $$-C(O)N(H)-CH_2CH_2CH_2CH_2CH_2CH_2-.$$

* * * * *